United States Patent
Hoffmann

(10) Patent No.: US 10,246,559 B2
(45) Date of Patent: Apr. 2, 2019

(54) METHOD FOR PREPARING SILICONE RESINS CONTAINING HYDROXY GROUPS AND ALKOXY GROUPS

(71) Applicant: Wacker Chemie AG, Munich (DE)

(72) Inventor: Sabine Hoffmann, Radebeul (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 15/566,742

(22) PCT Filed: Oct. 11, 2016

(86) PCT No.: PCT/EP2016/074366
§ 371 (c)(1),
(2) Date: Oct. 16, 2017

(87) PCT Pub. No.: WO2017/148546
PCT Pub. Date: Sep. 8, 2017

(65) Prior Publication Data
US 2018/0086881 A1    Mar. 29, 2018

(30) Foreign Application Priority Data
Feb. 29, 2016 (DE) ........................ 10 2016 203 192

(51) Int. Cl.
*C08G 77/06* (2006.01)
*C08G 77/16* (2006.01)
*C08G 77/18* (2006.01)

(52) U.S. Cl.
CPC ............ *C08G 77/16* (2013.01); *C08G 77/06* (2013.01); *C08G 77/18* (2013.01)

(58) Field of Classification Search
None
See application file for complete search history.

(56) References Cited

U.S. PATENT DOCUMENTS

| | | | | |
|---|---|---|---|---|
| 2,661,348 A * | 12/1953 | Welsh | ............. | C08G 77/00 525/479 |
| 4,732,996 A * | 3/1988 | Moorhead | ............. | C07F 7/20 556/466 |
| 5,391,673 A * | 2/1995 | Ekeland | ............. | C08G 77/04 528/12 |
| 6,069,220 A | 5/2000 | Hoffmann et al. | | |
| 7,339,069 B2 * | 3/2008 | Schattenmann | ............. | C07F 7/0874 556/471 |
| 7,514,518 B2 * | 4/2009 | Schattenmann | ............. | C08G 77/06 528/10 |
| 2006/0167202 A1 | 7/2006 | Schattenmann et al. | | |
| 2016/0145396 A1 | 5/2016 | Loessel et al. | | |

FOREIGN PATENT DOCUMENTS

| | | |
|---|---|---|
| DE | 10332622 A1 | 2/2004 |
| DE | 102005003899 A1 | 8/2006 |
| DE | 102013212980 A1 | 1/2015 |
| EP | 0700951 A1 | 3/1996 |
| EP | 0927734 A1 | 7/1999 |
| JP | 873593 A2 | 3/1996 |
| JP | 2010519398 A | 6/2010 |
| JP | 2015212338 A | 11/2015 |
| WO | 2008104881 A1 | 9/2008 |

* cited by examiner

Primary Examiner — Robert S Loewe
(74) Attorney, Agent, or Firm — Brooks Kushman P.C.

(57) ABSTRACT

The chlorohydrocarbon content of silicone resins prepared from alkoxysilanes is reduced by reacting alkoxysilane and 0.01-1 pbw chlorinated hydrocarbons with water at at least 50° C. and for at least 30 minutes, in the absence of a water immiscible solvent.

18 Claims, No Drawings

METHOD FOR PREPARING SILICONE RESINS CONTAINING HYDROXY GROUPS AND ALKOXY GROUPS

CROSS REFERENCE TO RELATED APPLICATIONS

This application is the U.S. National Phase of PCT Appln. No. PCT/EP2016/074366 filed Oct. 11, 2016, which claims priority to German Application No. 10 2016 203 192.9 filed Feb. 29, 2016, the disclosures of which are incorporated in their entirety by reference herein.

BACKGROUND OF THE INVENTION

1. Field of the Invention

The invention relates to a process for preparing silicone resins bearing hydroxy groups and alkoxy groups without addition of organic solvents.

2. Description of the Related Art

Silicone resins and precursors thereof can, as described, for example, in EP0927734, be prepared from chlorosilanes by partial or complete alkoxylation and subsequent partial or virtually complete hydrolysis in the presence of a solvent which is not miscible with water. The catalyst is usually the hydrogen chloride introduced by the chlorosilanes, or aqueous hydrochloric acid.

In the reaction of chlorosilanes with alcohol and water, it is an objective to recover the hydrogen chloride formed as completely as possible in order to avoid or minimize wastewater and reuse the hydrogen chloride for the chlorosilane synthesis. This occurs very successfully, as shown in DE102005003899, when using columns which consist of a reaction unit and a distillation unit. However, here too, the use of an organic solvent which does not participate in the reaction is necessary. Undesirable traces of this solvent, e.g. toluene, are frequently still present in the resin solutions and thus lead to restrictions to various fields of application.

The alkoxysilanes prepared from chlorosilanes by hydrolysis sometimes contain considerable amounts of chlorinated hydrocarbons due to the chlorosilane synthesis. Methods of chloride reduction with regard to such compounds by neutralization or removal by distillation are known. DE10332622 describes a process for dissociating chlorinated hydrocarbons which are present in alkoxysilanes and interfere in the further processing of alkoxysilanes as a result of hydrogen chloride formation. This process is complicated and the costs for the product are correspondingly high.

SUMMARY OF THE INVENTION

An object of the invention was to lower the content of chlorinated hydrocarbons in silicone resins produced by hydrolysis of alkoxysilanes. This object and other objects are achieved by reacting alkoxysilanes containing chlorinated hydrocarbons with water at at least 50° C. for minimally 30 minutes, in the substantial absence of water immiscible solvents.

DETAILED DESCRIPTION OF THE PREFERRED EMBODIMENTS

The invention thus provides a process for preparing silicone resins (S) bearing hydroxy groups and alkoxy groups,
wherein 100 parts by weight of alkoxysilane,
from 0.01 to 1 parts by weight of hydrocarbon containing, from 10 to 2000 ppm by weight of Cl based on the weight of the alkoxysilane, and water,
without further organic solvents which at 0.1 MPa and 20° C. are soluble to a maximum extent of 1% by weight in water,
are reacted at at least 50° C. for at least 30 minutes.

In the process, the chlorine bound to the hydrocarbon is eliminated as hydrogen chloride under the reaction conditions. This hydrogen chloride and the chloride formed therefrom act as hydrolysis and condensation catalyst in the process.

The alcohol formed in the reaction by hydrolysis of the alkoxysilanes leads to good distribution of the chloride in the reaction mixture.

Thus, the chlorinated hydrocarbons which often interfere in use or processing are utilized in the process for forming the catalyst for reactions such as hydrolysis of alkoxysilanes and subsequent condensations.

The silicone resins (S) can be prepared in the process without further solvent additions such as toluene. Since the alkoxysilanes used for the hydrolysis are prepared from chlorosilanes with virtually complete HCl recovery, there are barely any HCl losses in the overall process and there is the possibility of carrying out the process in a wastewater-free manner. The acidic alcohols formed in the process during the hydrolysis can be used for preparing the alkoxysilane.

The reaction can be carried out batchwise and also continuously. The alkoxysilane is preferably initially charged both in batch operation and for start-up of a continuously operating reactor. In this way, a starting mixture containing alcohol and chloride is produced. The initially charged alkoxysilane is preferably heated to a temperature which is not more than 5° C. higher or lower, in particular not more than 2° C. higher or lower than the boiling point of the alcohol formed in the hydrolysis, and is heated to at least 50° C., preferably at least 55° C., in particular at least 60° C.

The required amount of water is preferably metered into the initially charged alkoxysilane, preferably with stirring or pumped circulation.

A distillation for separating off the alcohol formed is preferably carried out after the reaction.

In the case of a batch process, the distillation can be carried out in the same reactor as was used for the reaction. In the case of a continuous process, the reaction product preferably goes into a second reactor in which it is firstly concentrated, preferably by distillation.

In the case of batch operation, the removal of volatile constituents can be carried out in the same reactor or in a further reactor or by means of a short path evaporator. In the case of a continuous process, the removal of volatile constituents can be carried out in the second reactor or in a further reactor or by means of a short path evaporator.

In this way, stable products within a tight specification range can be prepared.

The alkoxysilane employed preferably has the general formula (1), $$R_aSi(OR^1)_{4-a} \quad (1),$$

where
R is an unsubstituted or Cl-substituted $C_{1-18}$-hydrocarbon radical,
$R^1$ is an unsubstituted or Cl-substituted $C_{1-6}$-alkyl radical and
a is 1, 2 or 3.

Preferred alkoxysilanes are methyltrimethoxysilane, dimethyldimethoxysilane, trimethylmethoxysilane, methyltriethoxysilane, dimethyldiethoxysilane and trimethylethoxysilane and mixtures thereof. Preferred mixtures are methyltrimethoxysilane with trimethylmethoxysilane and methyltriethoxysilane with trimethylethoxysilane.

As radicals R, preference is given to hydrogen, $C_{1-8}$-alkyl radicals, $C_{2-8}$-alkenyl radicals and phenyl groups, in particular methyl, ethyl, vinyl and phenyl groups. The radicals $R^1$ are preferably n-propyl, i-propyl, ethyl or methyl groups, in particular methyl groups.

The Cl-containing hydrocarbon preferably contains from 1 to 12, more preferably from 2 to 6, carbon atoms. Examples of the Cl-containing hydrocarbon are chloroethane, chloropropanes, chlorobutanes and chloropentanes.

Preference is given to reacting from 0.02 to 0.5 parts by weight of Cl-containing hydrocarbon in the process.

The Cl-containing hydrocarbon preferably contains, based on alkoxysilane, from 100 to 1500 ppm by weight of Cl, in particular from 200 to 1100 ppm by weight of Cl.

Preference is given to reacting from 5 to 20 parts by weight of water, in particular from 8 to 15 parts by weight of water in the process.

As further organic solvents which at 0.10 MPa and 20° C. are soluble to a maximum extent of 1% by weight in water are, for example, hydrocarbons such as pentane, n-hexane, hexane isomer mixtures, heptane, octane, naphtha, petroleum ether, benzene, toluene and xylenes and also carbon disulfide and nitrobenzene. In the present process, from 15 to 60% by weight of alcohol, in particular from 40 to 50% by weight of alcohol, are preferably formed in the reaction mixture, depending on the amount of water used.

The silicone resins (S) bearing hydroxy groups and alkoxy groups which are preferably prepared have a dynamic viscosity at 25° C. of from 10 to 1000 $mm^2/s$, more preferably from 15 to 500 $mm^2/s$, in particular from 15 to 100 $mm^2/s$.

The silicone resins (S) preferably have from 0.01 to 2% by weight, more preferably from 0.02 to 1% by weight, and in particular from 0.05 to 0.2% by weight, of hydroxy groups.

The silicone resins (S) preferably have from 1 to 50% by weight, more preferably from 5 to 40% by weight, and in particular from 10 to 30% by weight, of alkoxy groups.

The reaction preferably takes place at at least 55° C. and not more than 180° C., preferably for from 40 to 300 minutes. The reaction preferably takes place at a pressure of from 0.05 to 0.5 MPa, in particular at ambient pressure.

All the symbols in the formulae above and in the claims have their meanings independently of one another. In all formulae, the silicon atom is tetravalent.

Unless indicated otherwise, all amounts and percentages indicated in the following examples are by weight, all pressures are 0.10 MPa (abs.) and all temperatures are 20° C. The kinematic viscosities are, unless indicated otherwise, determined on an SVM3000 rheometer from Anton Paar, in accordance with ASTM D7042. The Anton Paar viscometer SVM 3000 is a rotational viscometer and operates according to the Stabinger measuring principle. A tube rotating at a constant speed of rotation is filled with the sample in which the measuring rotor which rotates more slowly than the outer tube is located. Torque and speed of rotation are determined. The measurements are carried out in the newtonian range of samples. Unless indicated otherwise, all viscosities reported are at 25° C. and atmospheric pressure of 0.1 MPa.

EXAMPLE 1

695 g of methyltrimethoxysilane having a content of 106 ppm of chlorine bound to carbon were placed in a 1.5 l four-neck flask equipped with stirrer, thermometer, nitrogen flushing, heating, condenser and inlet tube, stirred and heated to 60° C. At this temperature, 95 g of partially deionized water was added over a period of 20-30 minutes via the inlet tube which dipped deeply into the product. The reaction mixture was stirred further under gentle reflux for one hour, after which the methanol formed by hydrolysis was removed by distillation. The distillation was carried out in two stages. At atmospheric pressure, methanol was driven off up to a temperature at the bottom of 145° C.; residual devolatilization occurred at 145° C., 80 mbar over a period of 45 minutes.

The dynamic viscosity of the end product was 16.5 $mm^2/s$ at 25° C. The end product contained 0.11% of hydroxy groups and 31.2% of methoxy groups.

EXAMPLE 2

The reaction procedure and the quality of the methyltrimethoxysilane corresponded to example 1, but the proportion of deionized water was increased from 95 g to 100 g in order to increase the viscosity slightly and slightly reduce the content of methoxy groups.

The dynamic viscosity of the end product was 26.3 $mm^2/s$ at 25° C. The end product contained 0.21% of hydroxy groups and 28.7% of methoxy groups.

Use of alkoxysilanes having a higher content of chlorinated hydrocarbons also enables the proportion of hydroxy groups to be reduced greatly. Methyltrimethoxysilane was used for the individual trials.

EXAMPLE 3

695 g of methyltrimethoxysilane having a content of 730 ppm of chlorine bound to carbon were placed in a 1.5 l four-neck flask equipped with stirrer, thermometer, nitrogen flushing, heating, condenser and inlet tube, stirred and heated to 60° C. At this temperature, 95 g of partially deionized water was added over a period of 20-30 minutes via the inlet tube which dips deeply into the product. The reaction mixture was stirred further under gentle reflux for one hour, after which the methanol formed by hydrolysis was removed by distillation. The distillation was carried out in two stages. At atmospheric pressure, methanol was driven off up to a temperature at the bottom of 145° C.; residual devolatilization occurred at 145° C., 80 mbar over a period of 45 minutes.

The viscosity of the end product was 16.5 $mm^2/s$ at 25° C. The end product contained 0.05% of hydroxy groups and 31.2% of methoxy groups.

EXAMPLE 4

The reaction procedure and the quality of the methyltrimethoxysilane corresponded to example 3, but the proportion of deionized water was increased from 95 g to 100 g in order to increase the viscosity slightly and slightly reduce the content of methoxy groups.

The viscosity of the end product was 36.2 $mm^2/s$ at 25° C. The end product contained 0.03% of hydroxy groups and 27.5% of methoxy groups.

In order to increase the capacity and slightly alter the product properties, the above batch process was adapted for two reactors and can thus proceed virtually continuously.

The hydrolysis reaction was carried out in the first stirred reactor. After a particular residence time, this hydrolysis product flowed into a subsequent stirred vessel where such an amount of alcohol could be driven off under atmospheric pressure that a concentrate having a solids content of 70-90% was obtained. Conditions which enable the product to be condensed more or less strongly were set via the solids content and the continuously inflowing hydrolysate. In a last step, the concentrate was devolatilized. For this purpose, the preceding hydrolysis reaction could be interrupted or two stirred vessels were operated. This means that while the devolatilization to give the end product occurred in one vessel, the distillation to give the condensate could occur in one vessel. A continuous process would thus be possible.

Example of the continuous process

EXAMPLE 5

695 g of methyltrimethoxysilane having a content of 279 ppm of chlorine bound to carbon were placed in a 1 l reactor equipped with stirrer, thermometer, nitrogen flushing, heating, condenser and inlet tube, stirred and heated to 60° C. At this temperature, 97.5 g of deionized water were added over a period of 20-30 minutes via the inlet tube which dipped deeply into the product. The reaction mixture was stirred further for 30 minutes under gentle reflux, after which the overflow into the subsequent 2 l stirred vessel was opened. After a fill level of 350 ml had been reached, heating was commenced. While the fill level in reactor 1 was kept constant at 800 ml by introduction of 695 g/h of the silane methyltrimethoxysilane and 97.5 g/h of water, concentration of the product occurred in the subsequent stirred vessel at temperatures at the bottom of 70-72° C. The hydrolysate arriving from reactor 1 was introduced far below the liquid surface of the concentrate, since this ensured that the catalyst necessary for the condensation was well distributed and could become effective.

After 1400 ml of concentrate has been reached, the hydrolysis was interrupted. The concentrate had a concentration of 82.9% and at this point in time still contained 21.4 ppm of HCl. The devolatilization and the associated deacidification were carried out at a pressure of 80-100 mbar and a temperature of 145° C. over a period of 45 minutes.

The dynamic viscosity of the end product was 26.5 mm²/s at 25° C. The end product contained 0.11% of hydroxy groups and 29.8% of methoxy groups.

The invention claimed is:

1. A process for preparing silicone resins bearing hydroxy groups and alkoxy groups, comprising:
   reacting at a temperature of at least 50° C. and for at least 30 minutes,
   a) 100 parts by weight of alkoxysilane,
   b) from 0.01 to 1 parts by weight of hydrocarbon containing, based on alkoxysilane, from 10 to 2000 ppm by weight of Cl, and
   c) water
   without the addition of organic solvent(s) which at 0.1 MPa and 20° C. are soluble to a maximum extent of 1% by weight in water.
2. The process of claim 1, wherein the alkoxysilane is initially charged into a reactor.
3. The process of claim 2, further comprising separating alcohol formed in the reaction by distillation after the reaction.
4. The process of claim 3, wherein an alkoxysilane has the formula (1), $$R_aSi(OR^1)_{4-a} \quad (1),$$

where
  R is an unsubstituted or Cl-substituted $C_{1-18}$-hydrocarbon radical,
  $R^1$ is an unsubstituted or Cl-substituted $C_{1-6}$-alkyl radical and
  a is 1, 2 or 3.
5. The process of claim 3, wherein the silicone resins contain from 0.01 to 2% by weight of hydroxy groups.
6. The process of claim 2, wherein an alkoxysilane has the formula (1), $$R_aSi(OR^1)_{4-a} \quad (1),$$

where
  R is an unsubstituted or Cl-substituted $C_{1-18}$-hydrocarbon radical,
  $R^1$ is an unsubstituted or Cl-substituted $C_{1-6}$-alkyl radical and
  a is 1, 2 or 3.
7. The process of claim 2, wherein the silicone resins contain from 0.01 to 2% by weight of hydroxy groups.
8. The process of claim 2, wherein the silicone resins have from 1 to 50% by weight of alkoxy groups.
9. The process of claim 1, further comprising separating alcohol formed in the reaction by distillation after the reaction.
10. The process of claim 9, wherein an alkoxysilane has the formula (1), $$R_aSi(OR^1)_{4-a} \quad (1),$$

where
  R is an unsubstituted or Cl-substituted $C_{1-18}$-hydrocarbon radical,
  $R^1$ is an unsubstituted or Cl-substituted $C_{1-6}$-alkyl radical and
  a is 1, 2 or 3.
11. The process of claim 9, wherein the silicone resins contain from 0.01 to 2% by weight of hydroxy groups.
12. The process of claim 9, wherein the silicone resins have from 1 to 50% by weight of alkoxy groups.
13. The process of claim 1, wherein an alkoxysilane has the formula (1), $$R_aSi(OR^1)_{4-a} \quad (1),$$

where
  R is an unsubstituted or Cl-substituted $C_{1-18}$-hydrocarbon radical,
  $R^1$ is an unsubstituted or Cl-substituted $C_{1-6}$-alkyl radical and
  a is 1, 2 or 3.
14. The process of claim 13, wherein the silicone resins contain from 0.01 to 2% by weight of hydroxy groups.
15. The process of claim 13, wherein the silicone resins have from 1 to 50% by weight of alkoxy groups.
16. The process of claim 1, wherein the silicone resins contain from 0.01 to 2% by weight of hydroxy groups.
17. The process of claim 16, wherein the silicone resins have from 1 to 50% by weight of alkoxy groups.
18. The process of claim 1, wherein the silicone resins have from 1 to 50% by weight of alkoxy groups.

* * * * *